US011969835B2

(12) United States Patent
Fleming et al.

(10) Patent No.: US 11,969,835 B2
(45) Date of Patent: Apr. 30, 2024

(54) TIP SAVER FOR A WELDING SYSTEM

(71) Applicant: LINCOLN GLOBAL, INC., City of Industry, CA (US)

(72) Inventors: Daniel P. Fleming, Cleveland, OH (US); Judah Benjamin Henry, Cleveland, OH (US); Matthew R. Pischel, Cleveland, OH (US)

(73) Assignee: LINCOLN GLOBAL, INC., City Of Industry, CA (US)

( * ) Notice: Subject to any disclaimer, the term of this patent is extended or adjusted under 35 U.S.C. 154(b) by 1200 days.

(21) Appl. No.: 16/538,392

(22) Filed: Aug. 12, 2019

(65) Prior Publication Data

US 2020/0306861 A1 Oct. 1, 2020

Related U.S. Application Data

(60) Provisional application No. 62/824,117, filed on Mar. 26, 2019.

(51) Int. Cl.
| | |
|---|---|
| *B23K 9/095* | (2006.01) |
| *B23K 9/073* | (2006.01) |
| *B23K 9/10* | (2006.01) |
| *B23K 9/12* | (2006.01) |

(Continued)

(52) U.S. Cl.
CPC .......... *B23K 9/0953* (2013.01); *B23K 9/0737* (2013.01); *B23K 9/10* (2013.01); *B23K 9/125* (2013.01); *B23K 37/006* (2013.01); *G05B 19/406* (2013.01); *G05B 2219/42271* (2013.01); *G05B 2219/45135* (2013.01)

(58) Field of Classification Search
CPC .... B23K 9/095; B23K 9/0953; B23K 9/0737; B23K 9/10; B23K 9/125; B23K 37/006

USPC ........ 219/136, 137.2, 130.5, 130.01, 130.51, 219/132; 700/212
See application file for complete search history.

(56) References Cited

U.S. PATENT DOCUMENTS

| | | | |
|---|---|---|---|
| 6,087,613 A | 7/2000 | Buda et al. | |
| 6,570,130 B1 | 5/2003 | Kooken et al. | |
| 7,381,923 B2 | 6/2008 | Gordon et al. | |

(Continued)

FOREIGN PATENT DOCUMENTS

| | | | | |
|---|---|---|---|---|
| CN | 101239414 A | | 8/2008 | |
| CN | 107803572 A | * | 3/2018 | ............... B23K 9/09 |

(Continued)

OTHER PUBLICATIONS

Machine translation of CN 107803572 performed on Jun. 28, 2023.*

(Continued)

*Primary Examiner* — Nathaniel E Wiehe
*Assistant Examiner* — Alba T Rosario-Aponte
(74) *Attorney, Agent, or Firm* — Brad C. Spencer

(57) ABSTRACT

A method of preventing arc flaring events for a welding system is provided. The method includes determining, by a controller, a real-time welding output characteristic of the welding system. The method additionally includes comparing, by the controller, the real-time welding output characteristic to a threshold welding output characteristic. The method further includes controlling an operating characteristic of the welding system in response to a determination that the real-time welding output characteristic exceeds the threshold welding output characteristic.

7 Claims, 12 Drawing Sheets

(51) Int. Cl.
    *B23K 37/00*     (2006.01)
    *G05B 19/406*     (2006.01)

(56)     References Cited

U.S. PATENT DOCUMENTS

| | | | |
|---|---|---|---|
| 8,389,897 B2 | 3/2013 | Sardy et al. | |
| 9,764,408 B2 | 9/2017 | Hutchison et al. | |
| 10,137,520 B2 | 11/2018 | Lambert et al. | |
| 2009/0173726 A1* | 7/2009 | Davidson | G05B 19/40937 |
| | | | 219/130.01 |
| 2011/0163072 A1* | 7/2011 | Vogel | B23K 9/095 |
| | | | 219/130.33 |
| 2014/0008342 A1 | 1/2014 | Peters | |
| 2014/0042136 A1* | 2/2014 | Daniel | G05B 19/4183 |
| | | | 219/130.5 |
| 2017/0046976 A1 | 2/2017 | Becker et al. | |
| 2017/0189984 A1* | 7/2017 | Daniel | B23K 9/0953 |
| 2017/0252847 A1 | 9/2017 | Daniel et al. | |
| 2018/0099346 A1* | 4/2018 | Zwayer | B23K 9/125 |
| 2018/0297141 A1 | 10/2018 | Uecker et al. | |

FOREIGN PATENT DOCUMENTS

| | | |
|---|---|---|
| GB | 0 751 394 A | 6/1956 |
| JP | 2018-069337 A | 5/2018 |
| WO | 2013-148922 A1 | 10/2013 |

OTHER PUBLICATIONS

"The Real Secrets to Stopping Burnback," Welding Supplies from IOC, Blog, accessed on Nov. 11, 2019 at https://www.weldingsuppliesfromioc.com/blog/the-real-secret-to-stopping-burnback/.

Giese, "The tipping point. How contact tip recess affects GMAW quality," The Welder, Sep. 11, 2007, accessed at https://www.thefabricator.com/thewelder/article/consumables/the-tipping-point.

Giese, "Tips for troubleshooting GMAW consumables," The Fabricator, Jun. 17, 2008, accessed at https://www.thefabricator.com/thefabricator/article/arcwelding/tips-for-troubleshooting-gmaw-consumables.

Millermatic 211 Owner's Manual, Miller Electric Mfg. Co. (2016), accessed on Nov. 11, 2019 at https://www.millerwelds.com/files/owners-manuals/O265809B_MIL.pdf.

PAK 200i Manual Air-Plasma Cutting & Gouging System, Thermal Dynamics, accessed on Nov. 11, 2019 at https://mam.esab.com/assets/1/BDBA5CC688D14EBE822C00D265DF8E7D/doc/BC86DDCE513F401C983EED3B21EEF8EE/V430146-en_US-FactSheet_Main-01.pdf.

Extended European Search Report for Corresponding Application No. 20165265.8; dated Aug. 31, 2020; pp. 1-7.

* cited by examiner

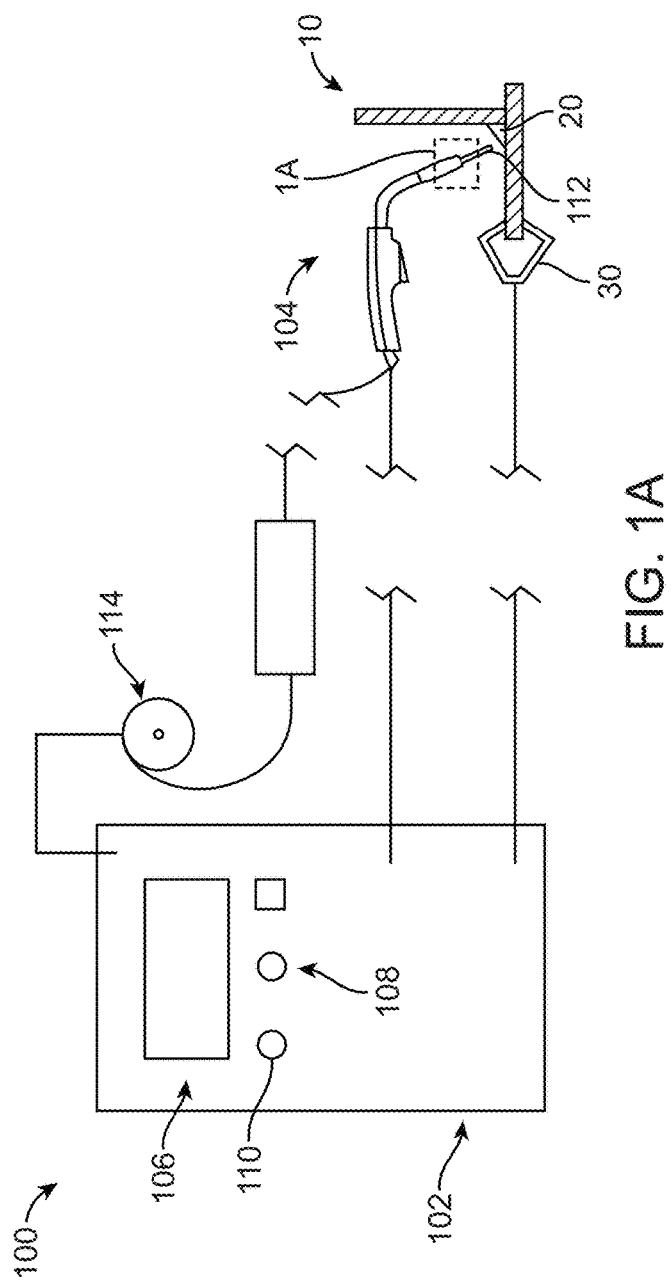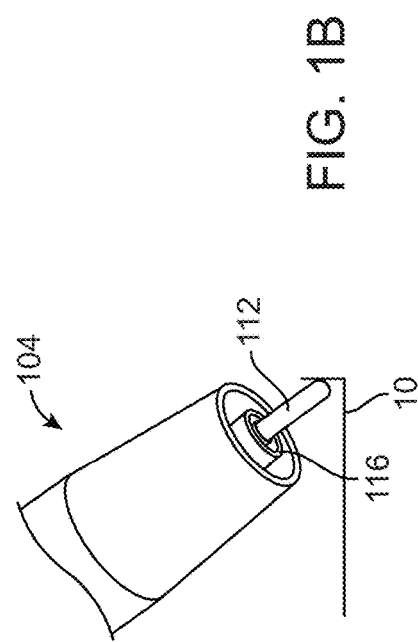

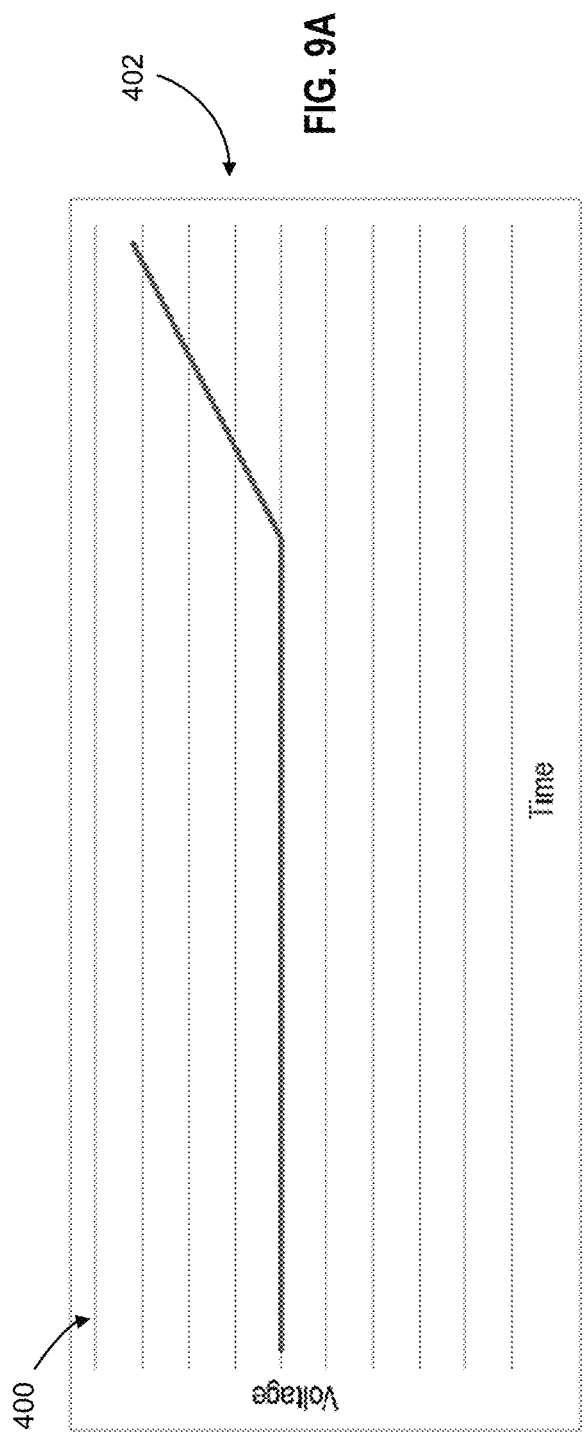
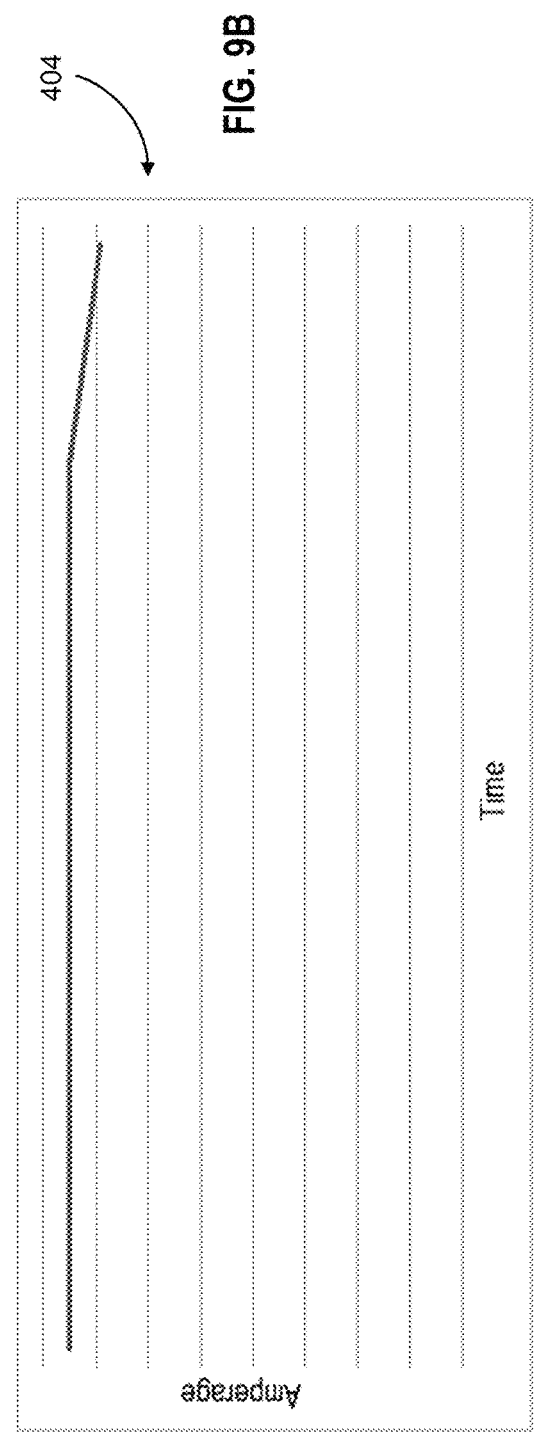
FIG. 9A
FIG. 9B

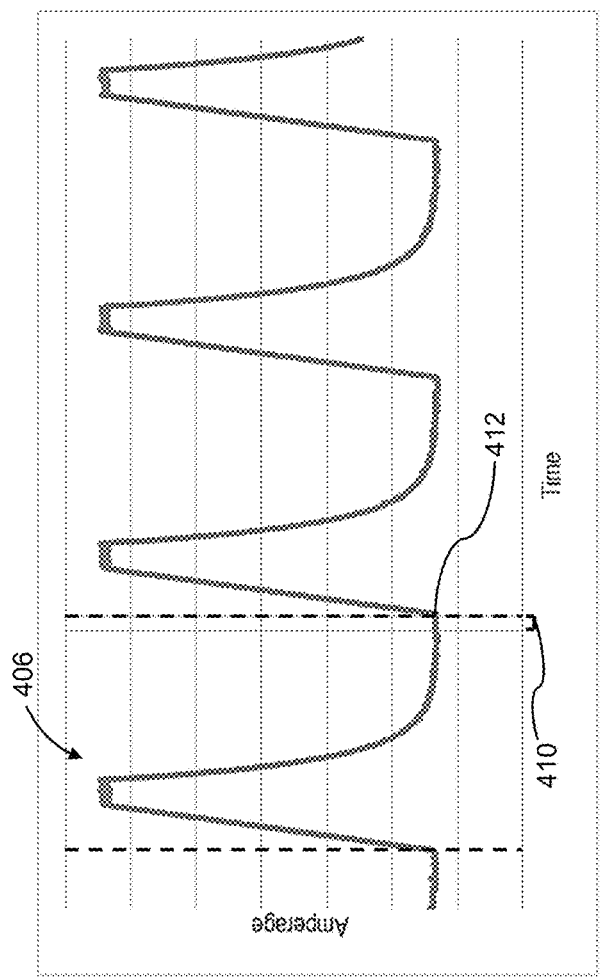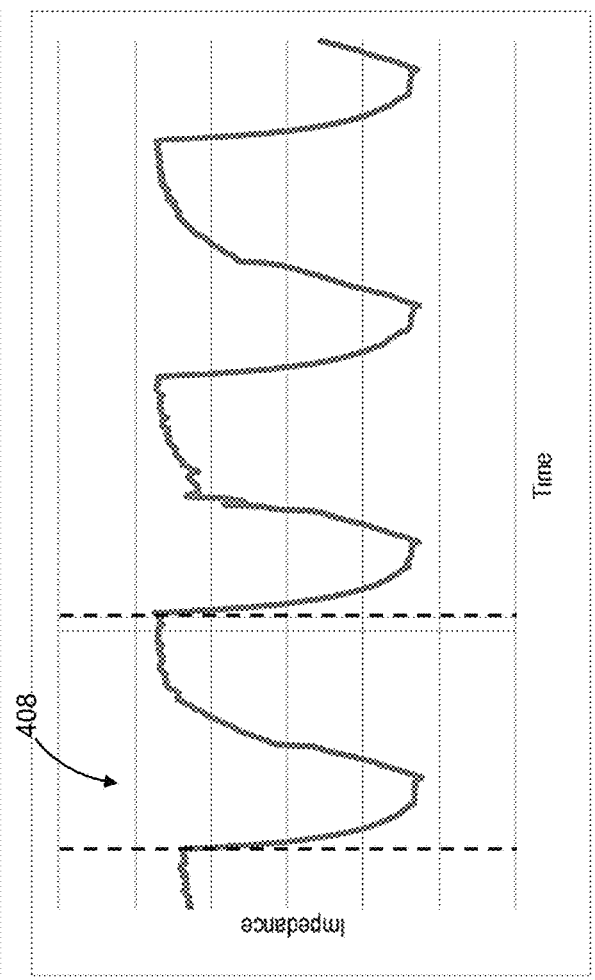

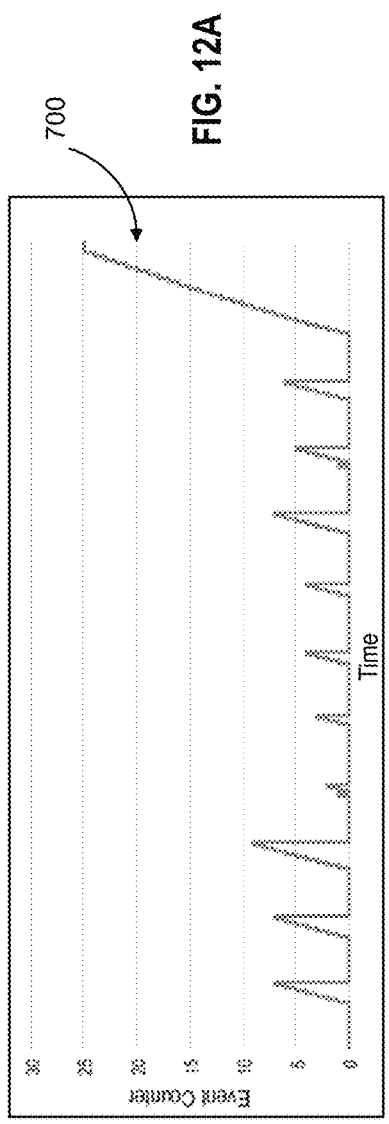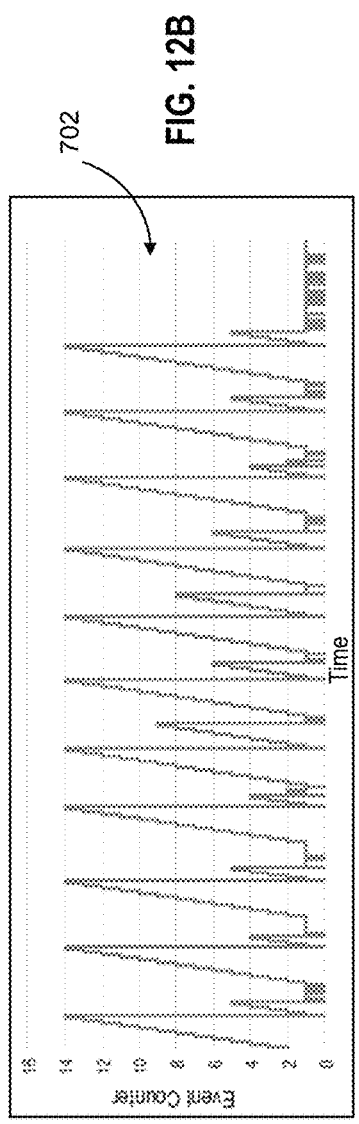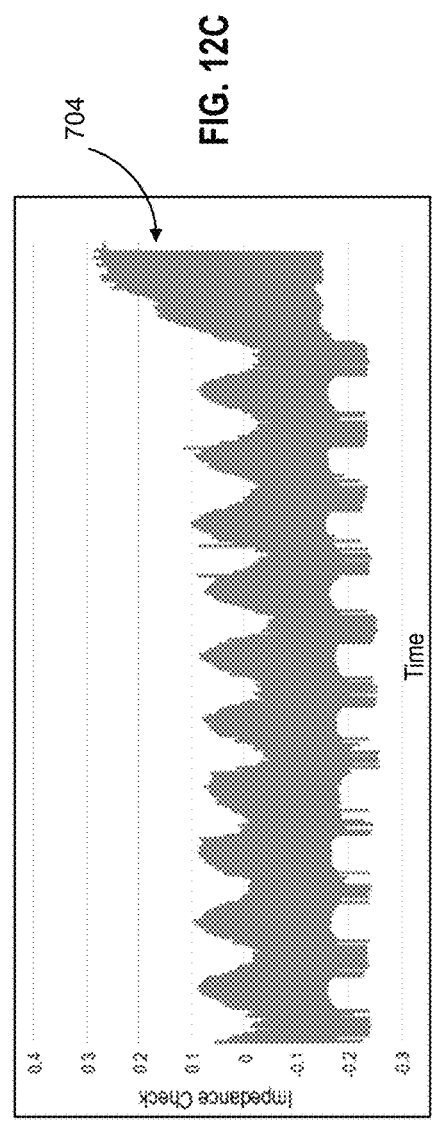

TIP SAVER FOR A WELDING SYSTEM

CROSS-REFERENCE TO RELATED PATENT APPLICATIONS

This application claims priority to and the benefit of U.S. Provisional Patent Application Ser. No. 62/824,117, filed Mar. 26, 2019, the disclosure of which is incorporated herein by reference in its entirety.

TECHNICAL FIELD

Certain embodiments of the present disclosure relate generally to an improved welding system and method for preventing tip damage due to arc flaring.

BACKGROUND

Existing gas metal arc welding (GMAW) systems include a shield gas and a consumable wire electrode. The electrode is fed through a contact tip of a welding gun toward a metal work piece. Current is transferred to the electrode through the contact tip, thereby heating the work piece and the wire electrode to create a welded joint. The performance of the welding system is dependent upon a variety of parameters including the feed rate of the wire electrode from the welding gun and the power transmitted through the wire to the work piece from the welding system.

Inconsistent wire feeding issues (e.g., a reduced feed rate, etc.) can result in a phenomenon known as "arc flaring" or "wire burn back" in which the arc begins to retreat away from the work piece and toward the contact tip of the welding gun. During an arc flaring event, the end of the wire is consumed until the flare reaches the contact tip of the welding gun. Ultimately the wire melts onto or otherwise damages the contact tip. In order to continue welding, an operator must replace or clean the contact tip and correct any feeding issues associated with the wire electrode. Depending on the severity of damage to the contact tip, arc flaring may cause significant machine down time.

SUMMARY

One embodiment of the present disclosure relates to a method. The method includes determining, by a controller, a real-time welding output characteristic of a welding system. The method includes comparing, by the controller, the real-time welding output characteristic with a threshold welding output characteristic. The method additionally includes controlling, by the controller, an operating characteristic of the welding system in response to a determination that the real-time welding output characteristic exceeds the threshold welding output characteristic.

In some embodiments, the threshold welding output characteristic is based on an average of a plurality of welding output characteristics. The operating characteristic of the welding system may be controlled in response to a determination that the real-time welding output characteristic exceeds the threshold welding output characteristic for a predefined time interval. For example, the threshold welding output characteristic may be a threshold rate of change of impedance. The real time welding output characteristic may be a rate of change of welding arc impedance of the welding system. In some embodiments, controlling the operating characteristic of the welding system may further include deactivating the welding system.

Another embodiment of the present disclosure relates to a system. The system includes a weld control unit and a contact tip operably coupled to the weld control unit. The weld control unit is configured to determine a real-time welding output characteristic. The weld control unit is configured to control a welding output at the contact tip based on the real-time welding output characteristic.

In some embodiments, the weld control unit is configured to determine a threshold welding output characteristic based on an average of a plurality of welding output characteristics. The welding output at the contact tip may be controlled based on a determination that the real-time welding output characteristic exceeds the threshold welding output characteristic for a predefined time interval.

In some embodiments, the weld parameter is one of a material of a wire electrode passing through the contact tip, a diameter of the wire electrode, a composition of gas distributed near the contact tip, and an energy supplied to the contact tip.

Another embodiment of the present disclosure is an apparatus. The apparatus includes a weld control unit including a memory storing machine readable instructions and a processor. The machine readable instructions are configured to cause the processor to perform operations including receiving voltage data regarding a welding system, receiving current data regarding the welding system, and controlling an operating characteristic of the welding system in response to at least one of the voltage data or the current data.

In some embodiments, the machine readable instructions cause the processor to determine a real-time welding output characteristic by dividing the voltage data by the current data. The machine readable instructions may cause the processor to determine a threshold welding output characteristic based on an average of a plurality of welding output characteristics. The operation characteristic may be controlled in response to a determination that the real-time welding output characteristic exceeds the threshold welding output characteristic for a predefined time interval.

In some embodiments, the operating characteristic includes one of an operating state of the welding system, a feed rate of a wire electrode through the welding system, a current supplied to a contact tip of the welding system, and an alert generated by the welding system.

BRIEF DESCRIPTION OF THE DRAWINGS

The disclosure will become more fully understood from the following detailed description, taken in conjunction with the accompanying figures, wherein like reference numerals refer to like elements, in which:

FIG. 1A is a side view of a welding system and work piece, according to an illustrative embodiment;

FIG. 1B is a perspective view of a contact tip of a welding tool from the welding system of FIG. 1A, according to an illustrative embodiment;

FIGS. 9A-9B are graphs showing voltage and current, respectively, as a function of time during a welding operation, according to an illustrative embodiment;

FIGS. 9C-9D are graphs showing individual current and welding-arc impedance waveform pulses, respectively, for a welding system, according to an illustrative embodiment;

FIGS. 12A-12C are graphs showing a first event counter, a second event counter, and a threshold welding output characteristic, respectively, for a welding system as a function of time during a welding operation, according to an illustrative embodiment;

DETAILED DESCRIPTION

Figure 2:
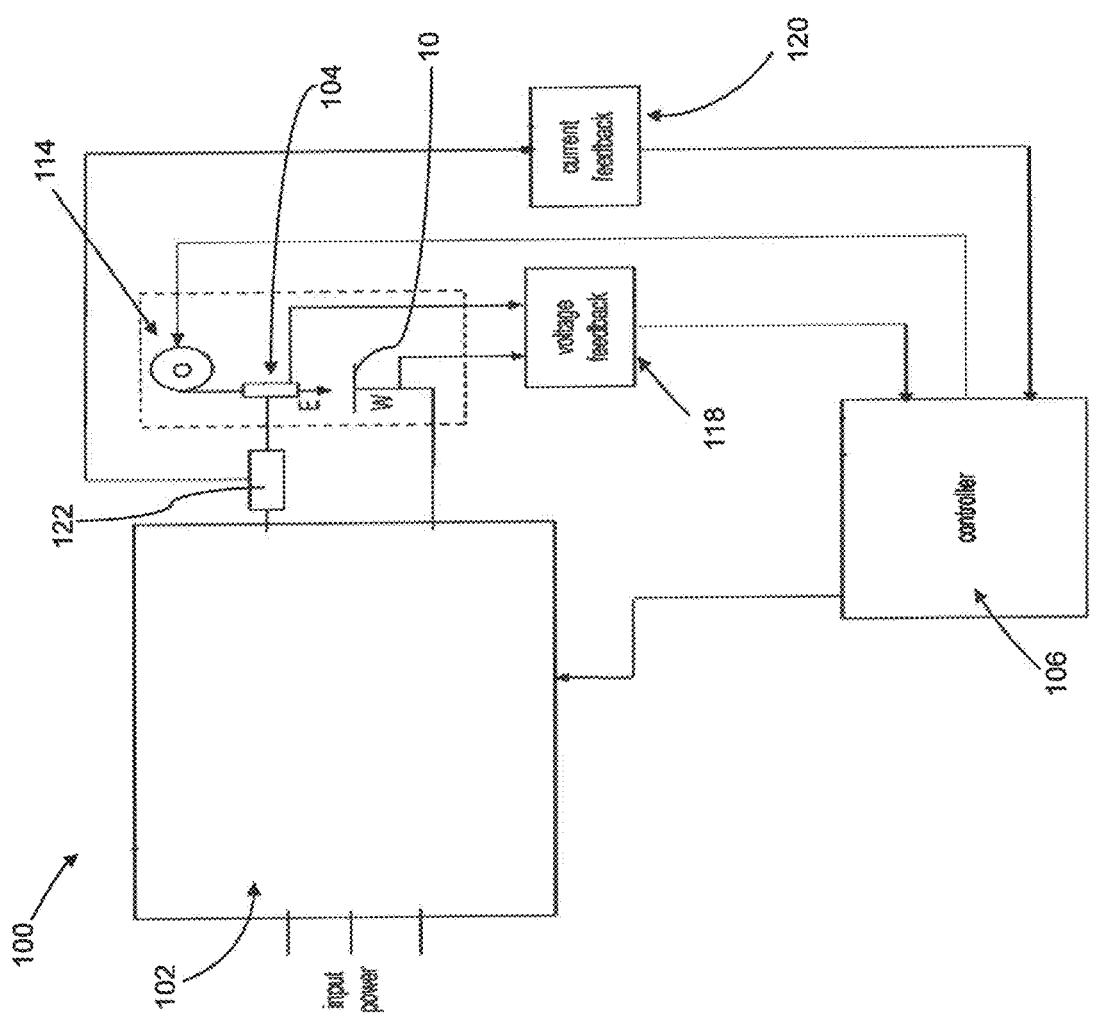
FIG. 2 is a block diagram of a control circuit for a welding system, according to an illustrative embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, improved welding systems and methods are shown. The welding systems and methods are configured to prevent damage to welding tools due to arc flaring. The welding system includes a weld control unit and a contact tip operably coupled to the weld control unit. The contact tip may form part of a welding tool that is configured to dispense a consumable wire electrode and a shielding gas. The contact tip may be electrically coupled to the wire electrode. The weld control unit is configured to supply a current to the contact tip (e.g., the wire electrode) and to control the contact tip based on a real-time welding output characteristic. The real-time welding output characteristic may be related to an amount of arc flaring (e.g., an arc length) between the wire electrode and the work piece. The real-time welding output characteristic may be a current supplied to the wire electrode, a voltage between the wire electrode and the work piece, a welding arc impedance of a weld circuit for the welding system (e.g., a ratio of the voltage over the current), or another derived metric. The weld control unit is configured to take a remedial action responsive to a determination that the real-time welding output characteristic exceeds a threshold welding output characteristic. The remedial action may include changing an operating state of the welding tool (e.g., deactivating the welding tool), adjusting a feed rate of the wire electrode, adjusting a current supplied to the contact tip, generating and transmitting an alert or warning message, and/or modifying another weld parameter. Among other benefits, deactivating the welding system when an arc flaring event is detected reduces the risk of wire burn back to the contact tip and the associated damage to the contact tip caused by the wire electrode melting onto the contact tip.

According to an illustrative embodiment, the threshold welding output characteristic is a function of a plurality of real-time welding output characteristics. For example, the threshold welding output characteristic may be determined by summing a predetermined impedance characteristic offset with a running average of the real-time welding output characteristics. Among other benefits, controlling the welding system based on a running average of the real-time welding output characteristic prevents false positive detection of wire burn back, which may be caused, for example, by performing welding operations on different work piece alloys or from repositioning the welding tool at different orientations relative to the work piece. These and other advantageous features will become apparent to those reviewing the present disclosure and figures.

Referring to FIG. 1A, a welding system 100 is provided, according to an illustrative embodiment. The welding system 100 may be a gas metal arc welding (GMAW) system such as a metal inert gas (MIG) welding system or a metal active gas (MAG) welding system used to join a metal work piece. The welding system 100 may be a pulse welding system configured to join an aluminum work piece 10 or another metal. In alternative embodiments, the welding system may be another form of welding system using different shielding gasses, wire electrode chemistries, and/or used to join different metals. The welding system may be configured to operate in multiple modes (e.g., to use different wire electrodes or and different welding parameters). As shown in FIG. 1A, the welding system 100 includes a power source 102 and a welding tool 104 operably coupled to the power source 102. The power source 102 provides an electric current to the welding tool 104 to form a weld 20 along the work piece 10.

As shown in FIG. 1A, the power source 102 includes a weld control unit, shown as controller 106. The controller 106 may include a user interface 108. For example, the controller 106 may include a display screen, indicators (e.g., light emitting diodes, etc.), and/or other visual and audible devices for communicating information to an operator or another device. The user interface 108 may additionally include onboard controls 110 to allow the operator to input commands or instructions into the controller 106. For example, the onboard controls 110 may be used by the operator to select weld parameters for the welding system 100 such as a chemistry of a wire electrode 112 (e.g., metal alloy composition, material, etc.), a size of the wire electrode 112, a composition of gas used by the welding system 100, or an energy supplied to the wire electrode 112. The onboard controls 110 may include knobs, switches, keypads, and the like. As shown in FIG. 1A, the power source 102 is electrically coupled to the work piece 10 by a ground cable clamp 30 or the like to form a weld circuit.

The welding system 100 includes a wire feed system 114 configured to supply the wire electrode 112 to the welding tool 104. The wire feed system 114 may include a wire feeder configured to receive the wire electrode 112 in the form of a spool, box, or other package. As shown in FIG. 1B, the wire electrode 112 is directed through a contact tip 116 of the welding tool 104 toward the work piece 10 (see also FIG. 1A). The contact tip 116 is electrically coupled to the power source 102 and wire electrode 112 so as to transmit electrical energy through the wire electrode 112. The wire electrode 112 is delivered or advanced through the welding tool 104 by the wire feed system 114 at a feed rate, which may be modified using the controller 106.

Referring to FIG. 2, a circuit diagram 200 for the welding system 100 is provided, according to an illustrative embodiment. In alternative embodiments, the welding system 100 may include additional, fewer, and/or different components. For convenience, like numerals are used to indicate like components. As shown in FIG. 2, the power source 102 is electrically coupled to the controller 106, the welding tool 104, and the work piece 10. The power source 102 may also be coupled to the wire feed system 114. The power source 102 may be a switching power supply unit including a power conversion circuit and a bridge switching circuit providing welding output power between the welding tool 104 (e.g., the contact tip 116) and the work piece 10. In some embodiments, the welding system 100 additionally includes a waveform generator, which generates welding waveforms (e.g., current waveforms) at the command of the controller 106.

As shown in FIG. 2, the controller 106 is operatively coupled to the power source 102. The controller 106 is configured to issue commands to the power source 102 to activate and deactivate the welding tool 104 and the wire feed system 114. The controller 106 is also operably coupled to the wire feed system 114 and is configured to issue commands to the wire feed system 114 to control, for example, a feed rate of the wire electrode 112 (e.g., a rotational speed of a spool in the wire feed system 114, a speed at which the wire electrode 112 is dispensed through the welding tool 104, etc.). The controller 106 may also be configured to control various other weld parameters of the welding system 100 (e.g., current, voltage, etc.). The welding system 100 additionally includes a voltage feedback circuit 118 and a current feedback circuit 120 to monitor the welding output voltage and current between the wire electrode 112 and the work piece 10 and provide monitored voltage data and current data back to the controller 106. The feedback voltage and current may be used by the controller 106 to make decisions with respect to operating the welding tool 104 or the wire feed system 114. According to an illustrative embodiment, the feedback voltage and current are used to determine a real-time welding output characteristic and a threshold welding output characteristic. The controller 106 is configured to modify an operating characteristic of the welding system 100 based on the impedance characteristics. The operating characteristic may be an operating state of the welding system (e.g., modifying the operating characteristic may include deactivating the welding system), a feed rate of the wire electrode 112 through the welding tool 104, a voltage and/or a current supplied to the wire electrode 112 (e.g., a waveform generated by the waveform generator, etc.), and the like.

The voltage feedback circuit 118 may include a voltage sensor integrated into the controller 106 or at another suitable location within the welding system 100. The voltage sensor is configured to measure the voltage (e.g., electrical potential) across the wire electrode 112 (e.g., the contact tip 116) and the work piece 10 (e.g., the ground clamp coupled to the work piece 10). In other words, the voltage sensor is electrically coupled to both the wire electrode 112 and the work piece 10. The voltage sensor is configured to provide real-time voltage data to the controller 106 during a welding operation.

The current feedback circuit 120 includes a current sensor 122 disposed in an electrical line between the power source 102 and the welding tool 104 (e.g., the contact tip 116). In other illustrative embodiments, the current sensor 122 may be disposed at a different location within the welding system 100. The current sensor 122 is configured to measure the current waveform provided to the wire electrode 112 during a welding operation. The current sensor 122 is configured to provide real-time current data to the controller during a welding operation. The current sensor 122 and voltage sensor may be one of a variety of current and voltage sensors known to those of ordinary skill in the art.

Figure 3:
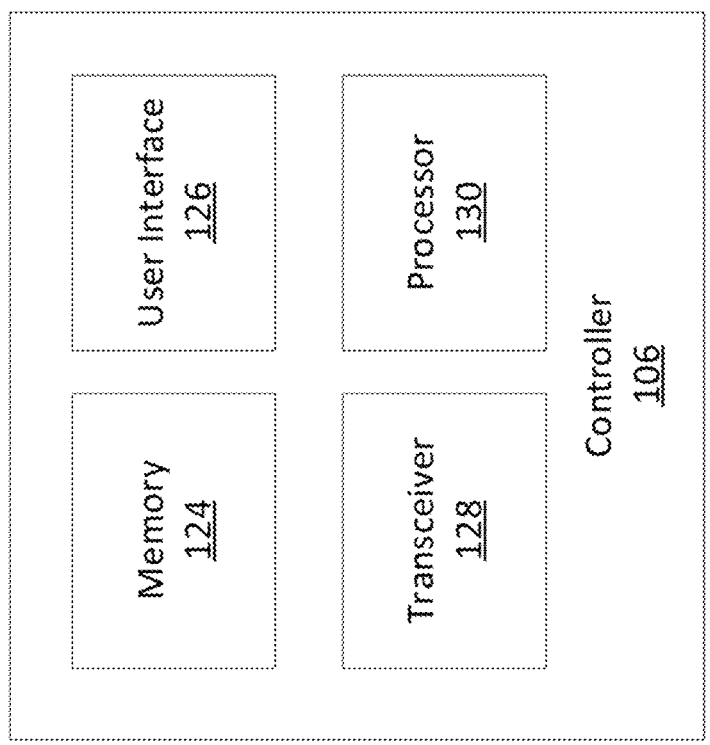
FIG. 3 is a block diagram of a controller of a welding system, according to an illustrative embodiment.

Referring to FIG. 3, a block diagram of the controller 106 for the welding system 100 is shown, according to an illustrative embodiment. In alternative embodiments, the controller 106 may include additional, fewer, and/or different components. As shown in FIG. 3, the controller 106 includes memory 124, a user interface 126, a transceiver 128, and a processor 130. Memory 124 for the controller 106 may be configured to store non-transient machine readable instructions. The instructions may include operating instructions that modify an operating characteristic of the welding system 100. For example, the operating instructions may be instructions to deactivate the welding system, to adjust a feed rate of the wire electrode 112, and/or to adjust a current and voltage supplied to the wire electrode 112. The instructions may additionally include instructions to generate an alert based on a real-time welding output characteristic and a threshold welding output characteristic determined from voltage data and current data received from the voltage feedback circuit 118 and the current feedback circuit 120, respectively. Memory 124 may be may include instructions to determine the real-time welding output characteristic and the threshold welding output characteristic from the voltage and current data. For example, the memory 124 may include instructions to periodically sample the voltage and/or current during a welding operation and to divide the voltage by the current to determine a welding arc impedance. Memory 124 may additionally include instructions to average the impedance over different time intervals.

Memory 124 may be configured to store a list of data collection parameters such as a frequency at which the voltage data and the current data are collected. Additionally, memory 124 may be configured to store a plurality of weld parameters for the welding system 100. For example, memory 124 may be configured to store different materials (e.g., alloys, compositions, chemistry, etc.) of the wire electrode 112, different sizes of the wire electrode 112, different gas compositions that may be used by the welding system 100, and energies (e.g., waveform current profiles, etc.) that may be supplied by the power source 102 to the wire electrode 112.

Memory 124 may also be configured to store identification information corresponding to the welding system 100. The identification information can be any indication through which other members of a network (e.g., other welding systems or remote computing devices) are able to identify the welding system 100. The identification information may be a unit number, a position within a building, or another form of location identification.

The user interface 126 may be used by an operator or another user to program and/or manually operate the welding system 100. For example, the user interface 126 can be used to adjust an operating characteristic of the welding system 100 such as deactivating the welding system 100, adjusting a feed rate of the wire electrode 112 through the welding system 100, and/or adjusting the voltage and the current supplied to the wire electrode 112. The user interface 126 may include one or more controls, knobs, buttons, keypads, touch screen displays, or another onboard control, which may be used by an operator to issue commands to the welding system 100 (e.g., the controller 106). The user interface 126 may also be used to alert the operator or another user of a problem with the welding system 100. For example, the user interface 126 may be configured to display a warning message that an arc flaring event has been detected and that the welding system 100 has been deactivated. Alternatively, or in combination, the user interface 126 may be configured to present instructions to the operator or another user to adjust welding parameters or to check the wire feed system 114 for issues (e.g., to add wire, to re-tension the spool for the wire feed system 114, to modify the feed rate, to modify the current and/or voltage, etc.).

The transceiver 128 may include a transmitter for transmitting information and/or a receiver for receiving information. As an example, the transceiver 128 may be configured to transmit real-time voltage data, current data, and derived metrics such as the real-time welding output characteristic and/or the threshold welding output characteristic from the controller 106 to a remote computing device. The transceiver 128 may additionally be configured to transmit alerts to the remote computing device. For example, the transceiver 128 may be configured to transmit a warning to the remote computing device indicating that an arc flaring event has been detected (e.g., that an arc length between the wire electrode 112 and the work piece 10 is increasing, etc.) or that the welding system 100 has been deactivated as a result of the real-time impedance exceeding an upper threshold impedance. The warning may include suggestions and/or options that may direct the user to restart the welding system 100 and/or to adjust an operating characteristic of the welding system 100. The transceiver 128 may be configured to receive operating instructions (e.g., the operating characteristic specified by the operator or another user) from the remote computing device.

Figure 4:
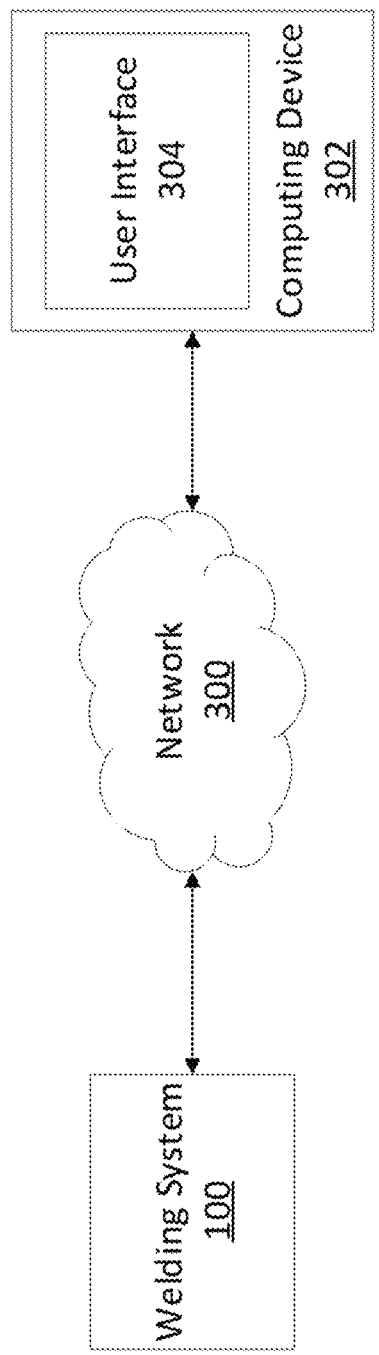
FIG. 4 is a block diagram of a computing network for a welding system, according to an illustrative embodiment.

FIG. 4 depicts a block diagram of a network 300 for a welding system 100 in accordance with an illustrative embodiment. In alternative embodiments, the network 300 may include additional, fewer, and/or different components. As shown in FIG. 4, the welding system 100 (e.g., the controller 106) is communicatively coupled to a remote computing device 302 via network 300. The network 300 may include a short-range communication network such as a Bluetooth network, a Zigbee network, and the like. Alternatively, or in combination, the network 300 may include a local area network (LAN), a wide area network (WAN), a telecommunications network, the Internet, a public switched telephone network (PSTN), and/or any other type of communication network known to those of skill in the art. According to an illustrative embodiment, the welding system 100 is directly connected to the remote computing device 302 through the network 300 so that, once an arc flaring event (e.g., increasing arc length) is detected or alerts are triggered, the remote computing device 302 will be notified. As shown in FIG. 4, the remote computing device 302 may include a user interface 304 configured to display information from the controller 106 and/or receive operator instructions and/or commands to be issued to the controller 106.

Returning to FIG. 3, the processor 130 may be operably coupled to each of the components of the controller 106, and may be configured to control interaction between the components. For example, the processor 130 may be configured to control the collection, processing, and transmission of voltage data, current data, and/or other derived metrics (e.g., the real-time welding output characteristic, the threshold welding output characteristic, etc.) for the welding system 100. The processor 130 may additionally be configured to determine derived metrics from the voltage data and the current data. For example, the processor 130 may be configured to determine a real-time welding output characteristic and a threshold welding output characteristic based on at least one of the voltage data and the current data. The real-time welding output characteristic may be the voltage or the current independently. In an illustrative embodiment, the real-time welding output characteristic is the welding arc impedance of the weld circuit. The processor 130 may be configured to compare the real-time welding output characteristic with the threshold welding output characteristic. The processor 130 may be configured to implement instructions (e.g., an operating characteristic for the welding system 100) from memory 124 based on a determination that the real-time welding output characteristic exceeds the threshold welding output characteristic.

Figure 5:
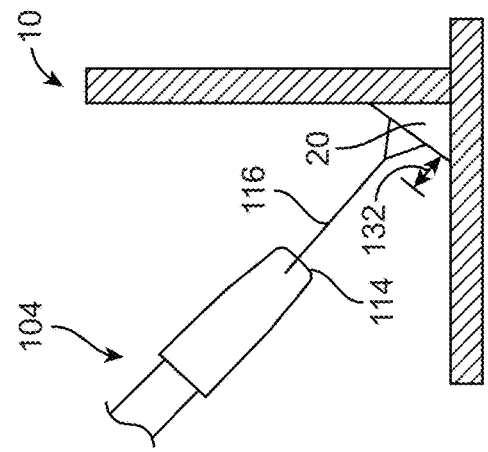
FIGS. 5-7 are side views of a welding operation during an arc flaring event, according to various illustrative embodiments.
Figure 6:
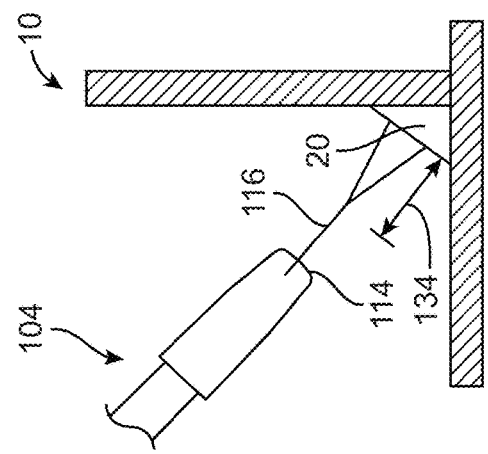
Figure 7:
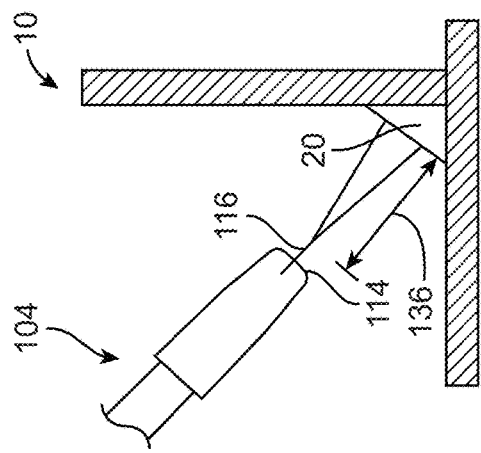

According to an illustrative embodiment, the controller 106 (see also FIGS. 1-2) is configured to reduce the risk of damage to the contact tip 116 of the welding tool 104 during welding operations by detecting arc flaring events (e.g., wire burn back events, an increase in the arc length between the wire electrode 112 and the work piece 10). FIGS. 5-7 generally depict the welding tool 104, wire electrode 112, and the work piece 10 during an arc flaring event. More specifically, FIGS. 5-7 depict how an arc length 132, 134, 136 between an end of the wire electrode 112 and a surface of the weld joint changes during a wire back burn event.

FIG. 5 shows a nominal arc length 132 that may be experienced during normal weld operations. It will be appreciated that the nominal arc length 132 may differ in various illustrative embodiments (e.g., depending on the wire chemistry, feed rate, and current and voltage supplied to the wire electrode 112, among other factors). FIGS. 6-7 show how the arc length 134, 136 increases during the wire back burn event. The end of the wire electrode 112 is consumed, pushing the end closer to the contact tip 116 of the welding tool 104. In FIG. 7, the end of the wire electrode 112 has nearly reached the contact tip 116.

Figure 8:
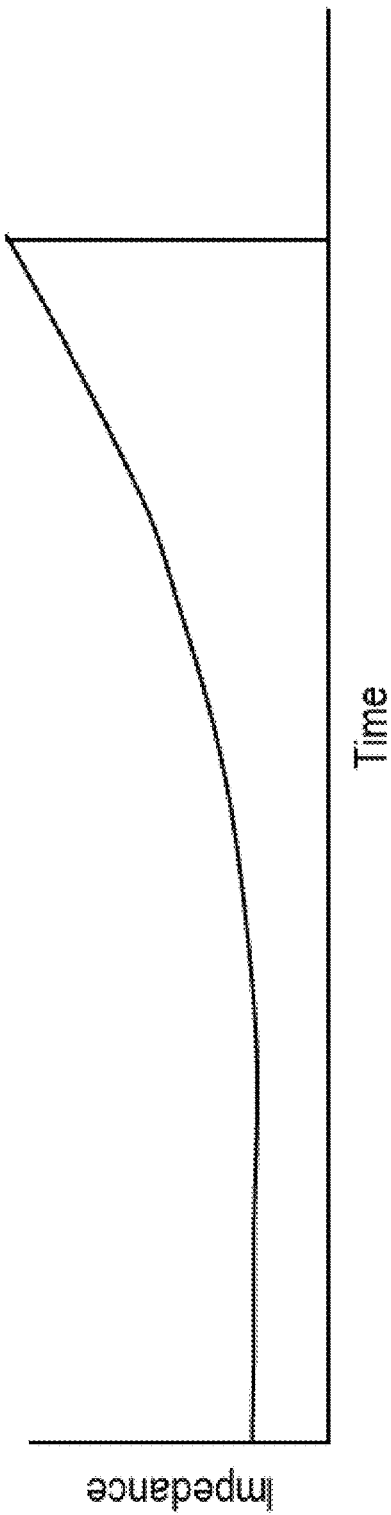
FIG. 8 is a graph showing impedance as a function of arc length, according to an illustrative embodiment.

Referring to FIG. 8, a graph of the welding arc impedance of the weld circuit (e.g., the ratio of the voltage over the current) during an arc flaring event is provided, according to an illustrative embodiment. As shown in FIG. 8, the impedance increases with increasing arc length 132, 134, 136. The rate of change of impedance also increases with increasing arc length 132, 134, 136.

FIG. 9A shows a graph 400 of voltage, shown as voltage data 402 and current, shown as current data 404, during a welding operation. The controller 106 (see also FIGS. 1-2) is configured to collect voltage data and current data continuously during a welding operation. The controller 106 may be configured to receive voltage data and current data multiple times during a current pulse of the welding system 100 (e.g., single periodic fluctuation of the current waveform).

As shown in FIGS. 9A-9B, the voltage data 402 and current data 404 begin to change abruptly toward the end of the welding operation (in a region of the graph indicated by the dashed arrow). The voltage data 402 is shown to increase abruptly, while the current data 404 is shown to decrease. The values of voltage and current may differ depending on the weld parameters used (e.g., the welding mode, etc.). The controller 106 is configured to determine a real-time welding output characteristic from the voltage data 402 and/or the current data 404. The real-time welding output characteristic may be equal to the voltage between the wire electrode 112 and the work piece 10, a power supplied to the contact tip 116, a rate of change of the voltage or the current, or a combination thereof. In an illustrative embodiment, the real-time welding output characteristic is a welding arc impedance of the weld circuit or a function of the welding arc impedance (e.g., a ratio of the voltage over the current, a rate of change of the welding arc impedance, etc.). Among other benefits, monitoring a combination of different parameters for the weld circuit improves detection of an arc flaring event as compared to monitoring changes in the voltage alone. Moreover, because the impedance is sensitive to different welding outputs, monitoring a combination of different parameters provides a more accurate approximation of how quickly the arc flaring event is progressing.

A real-time welding arc impedance (e.g., the real-time welding output characteristic) may be determined based on pulsed waveform data (e.g., current data, voltage data) received by the controller 106. As shown in FIGS. 9C-9D, the pulsed waveform data includes a plurality of periodically repeating pulses (e.g., current pulses 406 as shown in FIG. 9C, and corresponding pulses 408 of the real-time welding arc impedance as shown in FIG. 9D). As shown in FIG. 9C, a single periodic current pulse 406 includes a single up-down oscillation in current. Correspondingly, a single pulse 408 of the real-time welding arc impedance includes a single down-up oscillation in impedance. The controller 106 may be configured to sample the pulsed waveform data at a frequency that is much greater than the frequency of the periodic pulses so that fluctuations that occur within a single current pulse of the pulsed waveform data may be captured. In some embodiments, the frequency of the periodic pulses are based on a wire feed speed of the electrode.

According to an illustrative embodiment, the real-time welding arc impedance is determined using data from a final portion 410 of a single current pulse 406 (e.g., at a tail end of the current pulse 406, where the rate of change of current is small relative to other portions of the current pulse 406). The controller 106 may be configured to compare the real-time welding arc impedance (e.g., the real-time welding output characteristic) at any point during the final portion 410 of each periodic pulse, as shown in FIG. 9D, to a lower threshold impedance (e.g., a lower threshold welding output characteristic) to determine whether the lower threshold impedance has been exceeded, and to initiate a second event counter based on a determination that the real-time welding-arc impedance exceeds the lower threshold impedance.

The controller 106 may be configured to determine the real-time welding arc impedance (or another real-time welding output characteristic) from an average of the current data and/or voltage data during the final portion 410 of each periodic pulse (e.g., over a period of time up to and including the end of each periodic pulse or oscillation). In the illustrative embodiment of FIGS. 9C-9D, the controller 106 is configured to determine the real-time welding arc impedance using an average of the current data over a period of approximately 0.2 ms at the end of the final portion 410 of each periodic pulse of the pulsed waveform data. In other embodiments, the duration and location of data within each periodic pulse used to determine the real-time welding arc impedance (or another real-time welding output characteristic) may be different. For example, the controller 106 may be configured to determine a real-time welding output characteristic based on a final sample taken at the end 412 of the 0.2 ms period of each periodic pulse of the pulsed waveform data rather than an average of the data taken over the 0.2 ms period.

The controller 106 may also be configured to determine whether a short is detected at any point during each periodic pulse of the pulsed waveform data. If the short is detected within a predetermined period of time from when the real-time welding output characteristic is determined, the sample is skipped and the next good sample is used to update the real-time welding output characteristic (and the averaged parameters such as the baseline welding output characteristic, etc.). Additionally, in a scenario where a short is detected and the second event counter has been initialized (e.g., incremented by an integer value on the previous periodic pulse, etc.), the second event counter will be reset. Among other benefits, this prevents false positives of flare events in the weld circuit (i.e., a short cannot occur at the same time as an arc flaring event).

Figure 10:
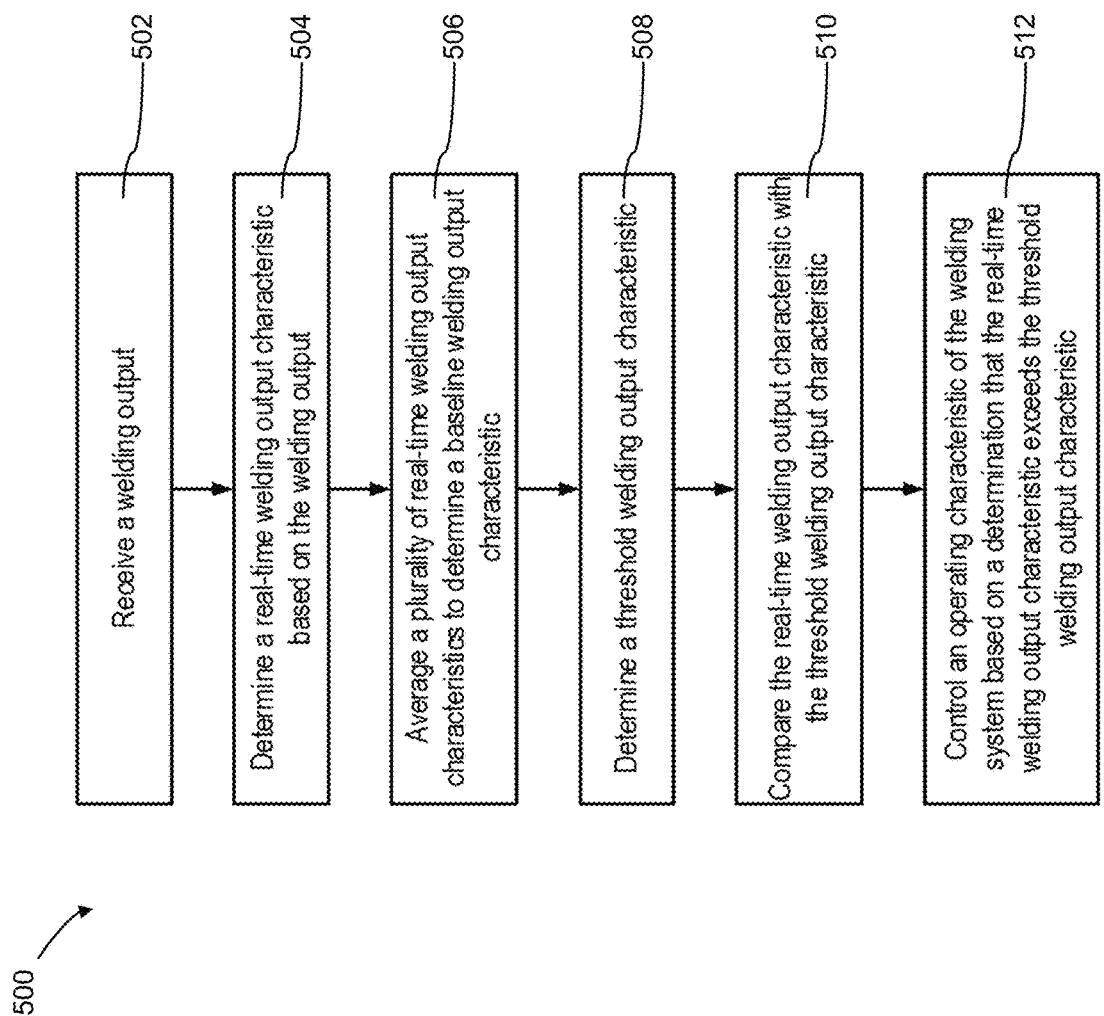
FIG. 10 is a flow diagram for a method of controlling an operating characteristic of a welding system, according to an illustrative embodiment.

Referring to FIG. 10, a method 500 of controlling an operating characteristic of a welding system is shown, according to an illustrative embodiment. In alternative embodiments, the method 500 may include additional, fewer, and/or different operations. The welding system may be the same or similar to the welding system 100 described with reference to FIGS. 1-4. At 502, a controller receives a welding output. The welding output may be a voltage between a wire electrode 112 of the welding system 100 and a work piece 10 (e.g., a voltage across the weld circuit, etc.) and/or a current supplied to the wire electrode 112 (e.g., by a contact tip 116 of a welding tool 104, etc.). The voltage may be received from a voltage sensor within the controller 106. The current may be received from a current sensor 122 coupled to an electrical line (e.g., a bonding wire, etc.) between the power source 102 and the welding tool 104. At 504, the controller 106 determines a real-time welding output characteristic based on the voltage and/or the current. The real-time welding output characteristic may be a power supplied to the welding system, a welding arc impedance, a rate of change of power or welding arc impedance, or another suitable output parameter. Operation 504 may additionally include causing a processor 130 of the controller 106 to divide the voltage by the current to determine the welding arc impedance. Alternatively, or in combination, operation 504 may include calculating a rate of change of welding arc impedance. Operation 504 may also include causing the processor 130 to scale the real-time welding output characteristic by a scaling factor in order to make it easier to differentiate between different real-time welding output characteristics.

In 506, the controller 106 averages a plurality of real-time welding output characteristics to determine a baseline welding output characteristic. According to an illustrative embodiment, operation 506 includes determining a running average of the real-time welding output characteristics using data that is spaced apart in time (e.g., by a first time interval). An example of determining a baseline welding output characteristic will be described in detail with reference to FIGS. 13, and 14A-14B. Operation 506 may additionally include causing the processor 130 to save real-time welding output characteristics to memory 124. Operation 506 may additionally include causing the processor 130 to record a first time interval or a number of samples during which none of the real-time welding output characteristics are saved to memory 124, and adding a new data point to the running average of the real-time welding output characteristics at the end of the first time interval (or once a given number of samples have been collected). Among other benefits, staggering the data points used to evaluate the running average over time helps to stabilize the threshold welding output characteristic and prevents false negative detection of arc flaring.

In some embodiments, operation 506 includes determining a welding output check by subtracting the baseline welding output characteristic from the real-time welding output characteristic. Advantageously, the welding output check can be compared directly to a predetermined threshold welding output characteristic offset without any further manipulation of the welding output data. In alternatively embodiments, operation 506 includes determining another suitable welding output metric based on the real-time welding output characteristic and the baseline welding output characteristic.

In 508, the controller 106 determines a threshold welding output characteristic from the baseline welding output characteristic. The threshold welding output characteristic may be an upper threshold impedance beyond which the controller 106 will deactivate the welding system (e.g., deactivate a welding output at the contact tip 116, deactivate the wire feed system 114, etc.) or a lower threshold value beyond which monitoring or remediation operations are triggered by the controller 106 (e.g., by the processor 130). Operation 508 may include summing the baseline welding output characteristic with a predetermined welding characteristic offset. Alternatively, operation 508 may include accessing a predetermined threshold welding characteristic offset and setting the threshold welding output characteristic equal to the offset. The predetermined welding characteristic offset may be experimentally determined for different welding systems 100 and may differ for different operating modes and/or weld parameters (e.g., welding arc impedance, feed rates, wire chemistries, gas compositions and flow rates, work piece materials, etc.). For example, in an aluminum pulse welding system, the threshold welding output characteristic offset may be a welding arc impedance offset of between 10-400 mΩ or another suitable welding arc impedance.

Operation 508 may include causing the processor 130 to determine the impedance characteristic offset based on a weld parameter regarding the contact tip 116. For example, the controller 106 may receive a weld parameter regarding the contact tip 116 from a user interface 126 of the welding system 100 or a remote computing device 302 that is communicatively coupled to the welding system 100. Operation 508 may additionally include causing the processor 130 to crawl through a list of impedance characteristic offsets to identify the impedance characteristic offset that corresponds with the selected weld parameter. Operation 508 may further include causing the processor 130 to store the threshold welding output characteristic in memory 124 for future use.

At 510, the controller 106 compares the real-time welding output characteristic with the threshold welding output characteristic. Operation 510 may include causing the processor 130 to access the threshold welding output characteristic stored in memory 124 and causing the processor 130 to perform a Boolean operation to determine whether the real-time welding output characteristic exceeds the threshold welding output characteristic. In some embodiments, operation 510 includes comparing the welding output check (e.g., a difference between the real-time welding output characteristic and the baseline welding output characteristic) to the predetermined welding output characteristic offset.

At 512, the controller 106 controls an operating characteristic of the welding system 100 based on a determination that the real-time welding output characteristic exceeds the threshold welding output characteristic (e.g., based on a determination that the welding output check exceeds the predetermined welding output characteristic offset, etc.). Controlling the operating characteristic may include one or more of deactivating the welding system, adjusting a feed rate of the wire electrode 112 through the welding system 100, adjusting the current supplied to the wire electrode 112, and generating and transmitting an alert or warning message. Operation 512 may include causing the processor 130 to deactivate the welding system 100 by decoupling the power source 102 from the contact tip 116 (e.g., deactivating the welding output at the contact tip 116, etc.). In some embodiments, operation 512 includes causing the processor 130 to transmit a warning message to a user interface of the welding system 108. In other embodiments, operation 512 may cause the processor 130 to transmit, via a transceiver 128, a digital signal over a network 300 to a remote computing device 302. The digital signal may include a warning message indicating a reason for deactivating the welding system 100. The warning message may indicate to an operator or other user that the power source 102 needs to be reset. In some embodiments, the warning message may indicate an elevated risk of shut-down due to arc flaring. In yet other embodiments, the warning message may include a suggested action be taken to prevent arc flaring. For example, the warning message may read "check the wire feeding system," "replenish wire electrode," or the like. Operation 512 may further include receiving, via the transceiver 128, instructions from the remote computing device 302 in response to the warning message or indication and controlling the welding system 100 based on the instructions. For example, the instructions may cause the processor 130 to reset the power source 102 or to modify the feed rate or another weld parameter. In some embodiments, the controller 106 may be configured to modify the operating characteristic automatically or based on predefined operator selections.

Figure 11:
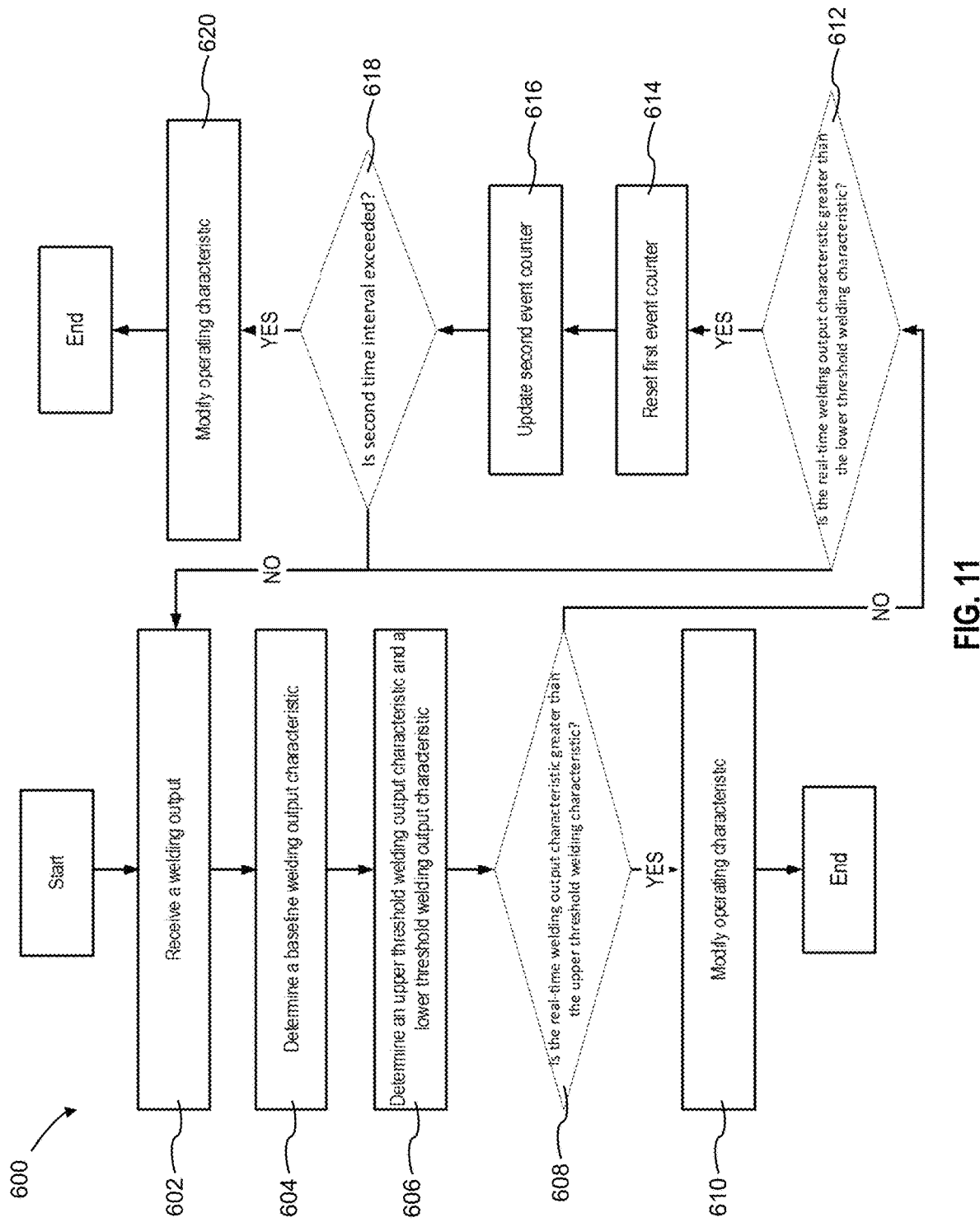
FIG. 11 is a flow diagram for a method of controlling an operating characteristic of a welding system, according to another illustrative embodiment.

FIG. 11 provides an example of a method 600 for modifying the operating characteristic of the welding system 100 using an upper and lower threshold welding output characteristic, according to an illustrative embodiment. At 602, a controller 106 receives a welding output. The welding output may be the voltage between the wire electrode 112 and the work piece 10 and/or the current supplied to the wire electrode 112. At 604, the controller 106 determines a baseline welding output characteristic. Operation 604 may be the same or similar to operations 504 and 506 described with reference to FIG. 10. At 606, the controller 106 determines both an upper threshold welding output characteristic and a lower threshold welding output characteristic that is less than the upper threshold welding output characteristic. The upper and lower threshold characteristics may be predetermined thresholds set (e.g., specified, input to the welding system 100, etc.) by an operator or another user. Alternatively, the upper threshold welding output characteristic may be, for example, a summation of the baseline welding output characteristic and an upper threshold welding output characteristic offset. In alternative embodiments, the upper threshold welding output characteristic may be equal to the upper threshold welding output characteristic offset. The lower threshold welding output characteristic may be, for example, a summation of the baseline welding output characteristic and a lower threshold welding output characteristic offset. In alternative embodiments, the lower threshold welding output characteristic may be equal to the lower threshold welding output characteristic offset.

According to an illustrative embodiment, the controller 106 is configured to monitor a number of times or an amount of time that the real-time welding output characteristic exceeds the lower threshold welding output characteristic (e.g., consecutively) without exceeding the upper threshold welding output characteristic. The number of times may be tracked using a second event counter. At 608, the real-time welding output characteristic is compared with the upper threshold welding output characteristic. If the real-time welding output characteristic is greater than the upper threshold welding output characteristic, the operating characteristic of the welding system 100 is modified (at 610) (e.g., the welding output at the contact tip 116 is deactivated, an alert/warning message is generated, etc.).

If the real-time welding output characteristic is less than the upper threshold welding output characteristic, the method 600 proceeds to operations 612-620. At 612, the real-time welding output characteristic is compared with the lower threshold welding output characteristic. If the real-time welding output characteristic is less than the lower threshold welding output characteristic, the method 600 returns to operation 602 and repeats. If the real-time welding output characteristic exceeds the lower threshold welding output characteristic, a first event counter is reset (at 614). The role of the first event counter will be described in further detail with referent to FIGS. 13-14. At 616, the second event counter is updated so that the number of consecutive faults (e.g., a number of times the real-time welding output characteristic exceeds the lower threshold welding output characteristic consecutively) can be tracked. Operation 616 may include causing the processor 130 to increment the counter by an integer value. At 618, the number of consecutive faults reported by the second event counter is compared with a second time interval or a second count threshold. If the second event counter reports a value that is less than the second count threshold, the method 600 returns to operation 602 and repeats. If the number of consecutive faults reported by the second event counter is greater than the second count threshold, than an operating characteristic of the welding system 100 is modified (at 620). According to an illustrative embodiment, the second count threshold is set to correspond with a second time interval (e.g., 0.2 s, etc.). Operation 620 may include triggering an alert to identify the condition to an operator or another user. In some embodiments, operation 620 may additionally include generating a warning message and transmitting the warning message to the remote computing device 302.

Referring now to FIGS. 12A-12C, the operation of the second event counter during a welding operation is shown, according to an illustrative embodiment. The value reported by the second event counter is indicated by line 700 and the value reported by the first event counter is indicated by line 702. A difference between the real-time welding output characteristic and the baseline welding output characteristic is indicated by line 704. As shown in FIGS. 12-12C, the second event counter is updated (e.g., incremented by an integer value) incrementally each instance that line 704 exceeds the lower threshold welding output characteristic offset (e.g., each time the real-time welding output characteristic exceeds the lower threshold welding output characteristic). Additionally, whenever the second event counter is updated/incremented, the first event counter resets. Among other benefits, resetting the first event counter prevents a gradual shift in the rolling average that would mask or otherwise conceal gradual arc flaring (e.g., that would prevent detection of an arc flaring event that progresses slowly) as will be described in more detail with reference to FIGS. 13 and 14A-14B. As shown in FIG. 12A, toward the end of the welding operation, the second event counter continues to increase until it exceeds the second count threshold, at which point the controller 106 deactivates the welding system 100.

Figure 13:
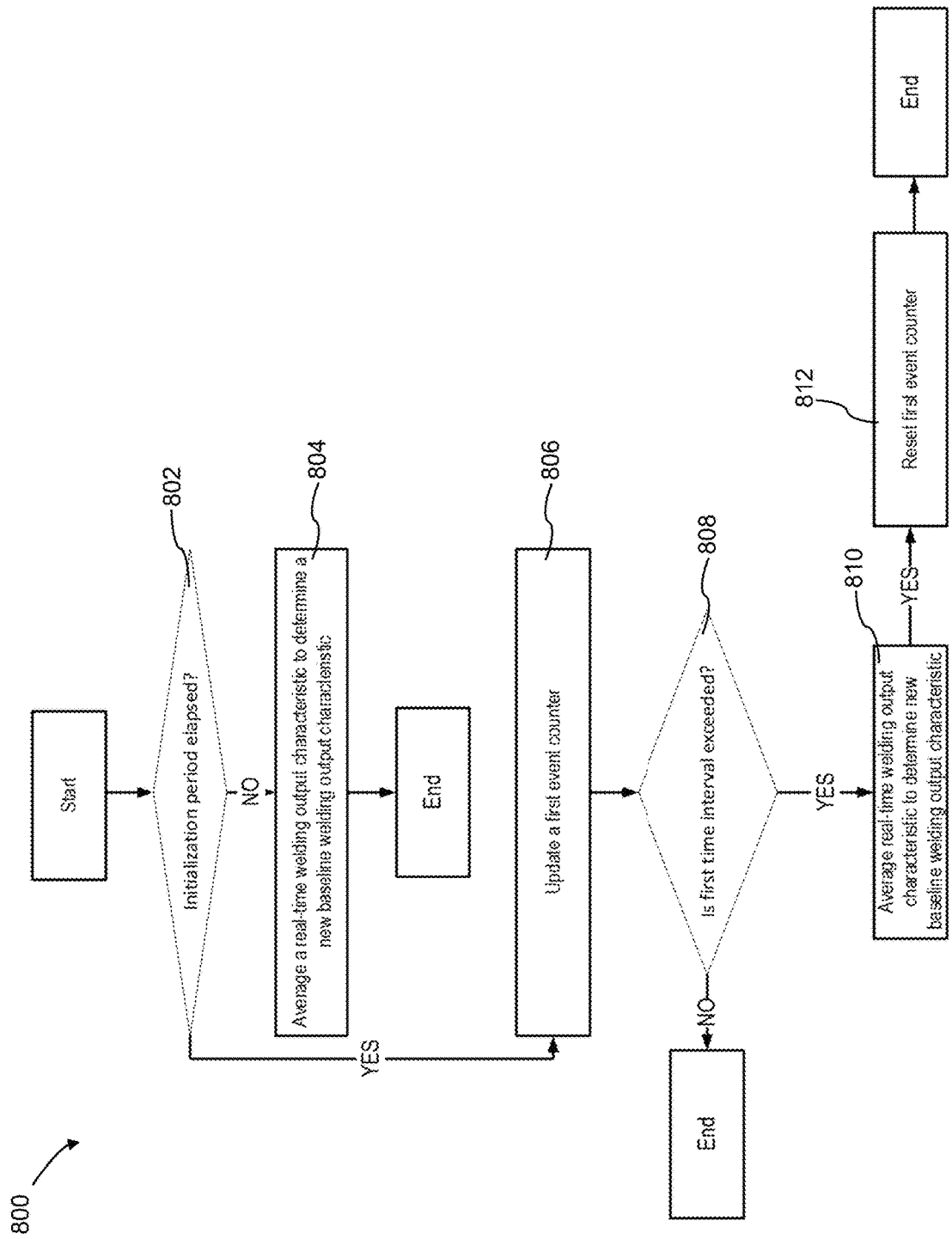
FIG. 13 is a flow diagram for a method of determining a baseline welding output characteristic for a welding system, according to an illustrative embodiment.

According to an illustrative embodiment, the threshold welding output characteristic is determined based on a running average of real-time welding output characteristics over a first time interval. Among other benefits, using a running average for the threshold welding output characteristic rather than a single predetermined threshold welding output characteristic reduces the risk of false detection that might occur, for example, as a result of repositioning the welding tool 104 relative to the work piece 10, modifying the composition of the work piece 10, modifying the chemistry, size, or feed rate of the wire electrode 112, or modifying another weld parameter. FIG. 13 provides an example of a method 800 for establishing a baseline welding output characteristic. At 802, the controller 106 compares the elapsed time with an initialization period during which the welding system 100 is starting up (e.g., up to and including a beginning of the welding operation). The initialization period may be determined by a manufacturer or designer of the welding system 100; for example, based on experimental data. As shown in FIG. 13, during the initialization period, the real-time welding output characteristic is automatically added to a rolling average of the baseline impedance (operation 804).

Figure 14A:
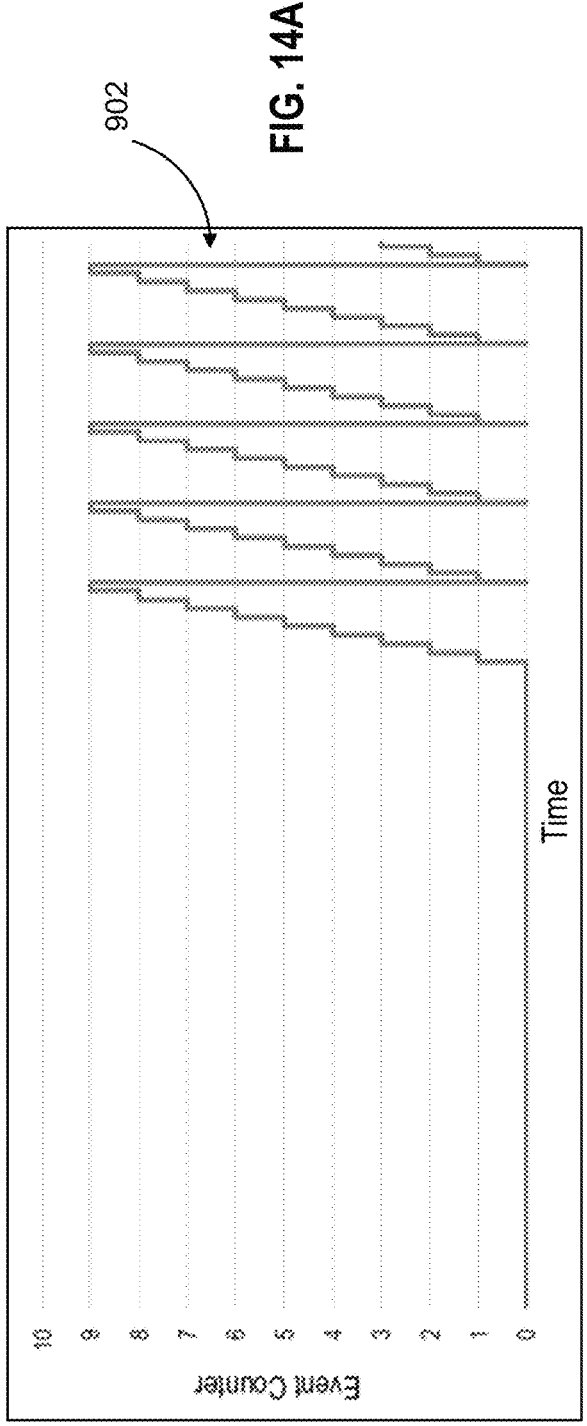
FIGS. 14A-14B are graphs showing a first event counter and a threshold welding output characteristic, respectively, as a function of time during a welding operation, according to an illustrative embodiment.
Figure 14B:
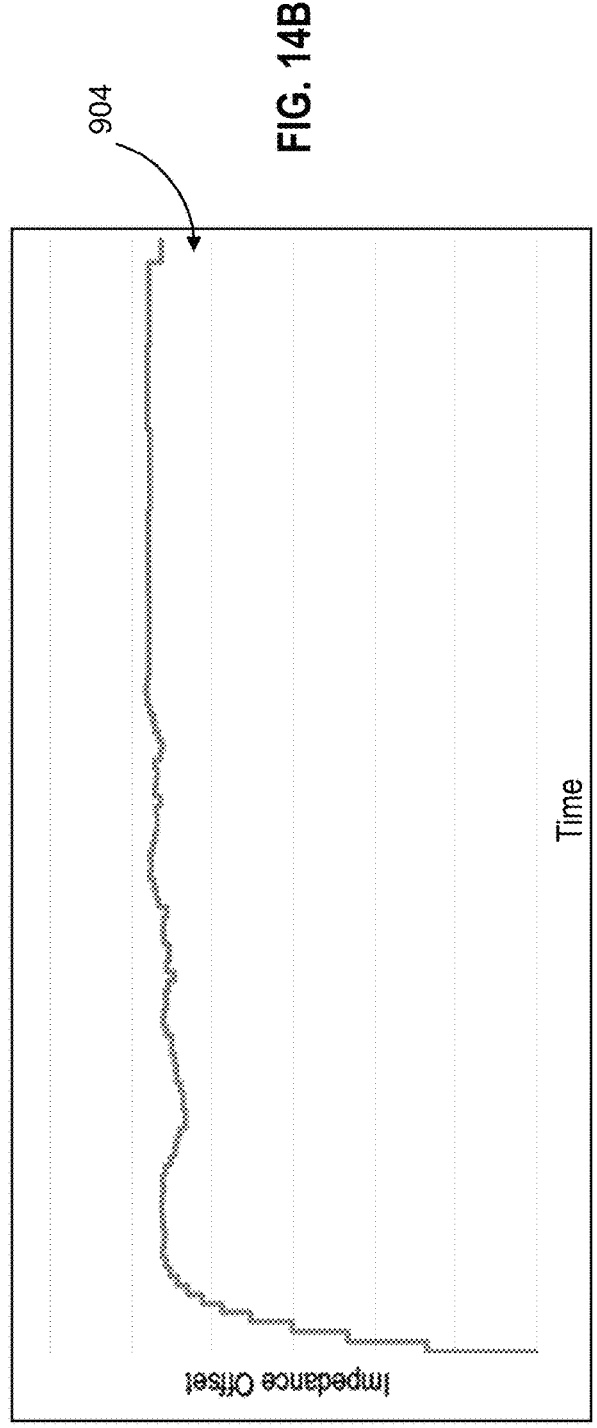

FIG. 14A shows a graph of a first event counter used to track a number of real-time welding output characteristics (e.g., data points) collected as a function of time during a welding operation (line 902). FIG. 14B shows a baseline welding output characteristic determined from the real-time welding output characteristics (e.g., the rolling average of the real-time welding output characteristics) over the same time period (line 904). In the example welding mode shown in FIGS. 14A-14B, the initialization period extends for approximately 0.5 s from the start of the welding operation. During this period, the first event counter is inactive and each data point of the real-time welding output characteristic is automatically added by the controller 106 to a rolling average used to determine the baseline welding output characteristic. Among other benefits, adding each data point of the real-time welding output characteristic determined during the start of a welding operation to the rolling average decreases the time required to establish a stable baseline welding output characteristic.

According to an illustrative embodiment, the method 800 includes reducing a frequency at which real-time welding output characteristics are added into the rolling average. Among other benefits, reducing this frequency improves computing efficiency and helps improve the stability of the baseline welding output characteristic. Returning to FIG. 13, once the initialization period has elapsed, method 800 proceeds to implement operations 806-812. At 806, the first event counter is updated. Operation 806 may include causing the processor 130 to increment the first event counter by an integer value in order to space apart the real-time welding output characteristics used to evaluate the rolling average by a first time interval. The first time interval may be specified by a manufacturer or designer of the welding system 100; for example, based on experimental data for each welding mode. The first time interval may be expressed as a first counter threshold, which represents a number of data points to be collected before the running average is recalculated. At operation 808, the value of the first event counter is compared to the first counter threshold (e.g., by the processor 130 by comparing the value of the first event counter with the first counter threshold stored in memory 124). If the first event counter has not exceeded the first counter threshold, no further action is taken by the controller 106. At 810, once the controller 106 detects that the value of the first event counter is equal to the first counter threshold, the most recent real-time welding output characteristic is added into the rolling average. At 812, the controller 106 resets the first event counter in preparation for the next current waveform cycle.

As shown in FIGS. 14A-14B, after the initialization period (e.g., approximately 0.5 s from the start of the welding operation), the first event counter is activated. In the welding mode used in FIGS. 14A-14B, the first event threshold is equal to 9. In other words, the most recent real-time welding output characteristic is added to the running average every 9 samples. In other embodiments, the spacing between samples used to determine the running average is based on a sampling frequency. For example, in a pulse welding mode, the welding system 100 may be configured to sample data at a frequency of approximately 10 Hz (e.g., to space the data used to evaluate the running average by approximately 0.01 s). In other embodiments (e.g., in other welding modes and with other wire feed speeds, etc.), the first event threshold may be different. In various embodiments, a frequency of the periodic pulses in the pulsed waveform data will increase with an increase in wire feed speed in the same welding mode.

According to an exemplary embodiment, the controller 106 ignores the threshold welding output characteristic until a predetermined time from the start of the welding operation. The predetermined time may vary based on the welding mode and other weld parameters. For example, the predetermined time may be 0.75 s or another time to allow for normalization of the baseline welding output characteristic. Among other benefits, incorporating a delay into the controller algorithm prevents false positives (e.g., inaccurately detecting an arc flaring event when it has not occurred) or false negatives (e.g., not detecting an arc flaring event that is occurring) that might otherwise be detected as a result of using voltage and current data during initialization of the welding system 100.

In an illustrative embodiment, any of the operations described herein are implemented at least in part as computer-readable instructions stored on a non-transitory computer-readable medium. Upon execution of the computer-readable instructions by a processor, the computer-readable instructions can cause the controller 106 to perform the operations. For example, with reference to method 500 of FIG. 10, the instructions may be operating instructions causing the processor 130 to receive voltage data regarding the welding system 100 and current data regarding the welding system 100. The instructions may cause the processor to control an operating characteristic of the welding system 100 in response to the voltage data and the current data and/or a real-time welding output characteristic determined based on the voltage data and/or the current data.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the cylinder propping system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system, comprising:
a welding power source including a controller comprising a processor, a user interface, and a memory, wherein the welding power source further includes a voltage feedback circuit including a voltage sensor configured to measure a voltage across a wire electrode and a workpiece and provide real-time voltage data to the controller, and a current feedback circuit including a current sensor configured to measure a current provided to the wire electrode and provide real-time current data to the controller, wherein the welding power source is configured to detect an arc flaring event by calculating a real-time welding arc impedance and comparing the real-time welding arc impedance or a rate of change of the real-time welding arc impedance to a threshold value;
a welding tool comprising a contact tip operably coupled to the welding power source, wherein the welding power source is configured to control a welding output at the contact tip based on detecting the arc flaring event, and generate an arc flaring event warning message based on detecting the arc flaring event; and
a wire feeder configured to supply the wire electrode to the welding tool,
wherein the welding output comprises a plurality of current pulses and the welding power source calculates the real-time welding arc impedance from a voltage measurement and a current measurement made during a 0.2 ms tail end of a current pulse of said plurality of current pulses that immediately precedes a subsequent current pulse of said plurality of current pulses, and wherein the real-time welding arc impedance is calculated based on an average of voltage and current measurements made during the 0.2 ms tail end of a current pulse.

2. The system of claim 1, wherein the threshold value is a threshold impedance and, wherein the user interface is configured to receive a weld parameter regarding the contact tip, and wherein the welding power source is configured to determine the threshold impedance based on the weld parameter regarding the contact tip, and further wherein the welding output at the contact tip is adjusted upon detecting the arc flaring event, and wherein the arc flaring event is detected based on a determination that the real-time welding arc impedance exceeds the threshold impedance for a predefined time interval.

3. The system of claim 1, wherein the welding power source includes a network communications interface, wherein the network communications interface is configured to transmit data to and receive data from a remote computing device, wherein the welding power source is configured to transmit the arc flaring event warning message to the remote computing device.

4. The system of claim 1, wherein the welding power source calculates the real-time welding arc impedance from a voltage between the wire electrode and a work piece and a current supplied to the wire electrode through the contact tip.

5. The system of claim 4, wherein the threshold value is a threshold rate of change, and the welding power source is configured to detect the arc flaring event from the rate of change of the real-time welding arc impedance exceeding the threshold rate of change.

6. A system, comprising:
a welding power source including a controller comprising a processor, a user interface, and a memory, wherein the welding power source further includes a voltage feedback circuit including a voltage sensor configured to measure a voltage across a wire electrode and a workpiece and provide real-time voltage data to the controller, and a current feedback circuit including a current sensor configured to measure a current provided to the wire electrode and provide real-time current data to the controller,
a welding tool comprising a contact tip operably coupled to the welding power source; and
said wire electrode that is fed through the contact tip by a wire feeder, wherein a welding output at the contact tip comprises plurality of current pulses that are transferred to the wire electrode through the contact tip,
wherein the welding power source is configured to detect an arc flaring event by calculating a real-time welding arc impedance and comparing the real-time welding arc impedance or a rate of change of the real-time welding arc impedance to a threshold value, and adjust the welding output at the contact tip based on detecting the arc flaring event, and generate an arc flaring event warning message based on detecting the arc flaring event,
wherein the welding power source calculates the real-time welding arc impedance from a voltage measurement and a current measurement made during a tail end of a current pulse of said plurality of current pulses, wherein said tail end immediately precedes a subsequent current pulse of said plurality of current pulses and is 0.2 ms in duration, and
wherein the threshold value is a threshold impedance and the welding power source is configured to determine the threshold impedance based on respective averages of a plurality of voltage and current measurements, and wherein the arc flaring event is detected based on a determination that the real-time welding arc impedance exceeds the threshold impedance for a predefined time interval.

7. The system of claim 6, wherein the welding power source includes a network communications interface, wherein the network communications interface is configured to transmit data to and receive data from a remote computing device, wherein the welding power source is configured to transmit the arc flaring event warning message to the remote computing device.

* * * * *